331-98

Feb. 22, 1966 M. CAMPI 3,237,122
STRIPLINE OSCILLATOR
Filed March 20, 1964

INVENTOR,
MORRIS CAMPI
BY: Harry M. Saragovitz,
Edward J. Kelly,
Herbert Berl &
J. D. Edgerton 3,237,122
STRIPLINE OSCILLATOR Morris Campi, Washington, D.C., assignor to the United States of America as represented by the Secretary of the Army Filed Mar. 20, 1964, Ser. No. 353,640
3 Claims. (Cl. 331—98)
(Granted under Title 35, U.S. Code (1952), sec. 266)

The invention described herein may be manufactured and used by or for the Government of the United States of America for governmental purposes without the payment to me of any royalty thereon.

This invention relates generally to oscillators, and more particularly to an improved construction of very high frequency vacuum tube oscillators.

The operation of oscillators at very high frequencies is complicated by transit-time effects, the inductance of the leads to the tube electrodes, and the capacitance of leads and electrodes. As a result, oscillators for the higher frequencies typically employ tubes especially designed for high-frequency operation, and make use of circuits that in common use at the lower frequencies. One such tube is the parallel-plane or "lighthouse" tube in which the active parts of the cathode, grid and plate are parallel planes and the leads are metal disks. Oscillator circuits using this type of tube often comprise resonant coaxial lines. The construction of these and similar oscillators is of critical importance for stable operation. The requirements of mechanical rigidity and strength for military and industrial applications greatly increases the cost and weight of these oscillators.

It is therefore an object of this invention to provide a very high frequency oscillator which is inexpensive to manufacture, easily reproduceable, lightweight, and is at the same time mechanically stable under the influence of shock, vibration and large variations in temperature.

It is another object of the invention to provide a very high frequency oscillator which is produced by printed circuit techniques.

It is a further object of the present invention to provide a very high frequency oscillator having circuit parameters which do not change under the influence of the physical environment.

According to the present invention, the foregoing and other objects are attained by providing means by which a parallel plane vacuum tube is combined with stripline circuits. The stripline circuits are designed to resonate with the plate to grid interelectrode capacitance of the tube.

The specific nature of the invention, as well as other objects, aspects, uses and advantages thereof, will clearly appear from the following description and from the accompanying drawings, in which.

Figure 1:
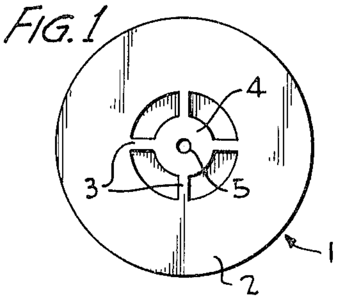
FIG. 1 is a plan view of the plate printed circuit board etched in stripline configuration.
Figure 2:
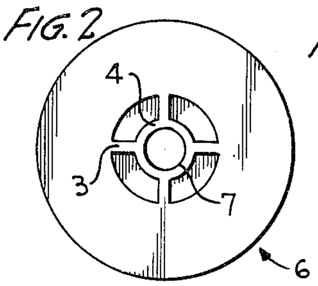
FIG. 2 is a plan view of the grid printed circuit board etched in stripline configuration.
Figure 3:
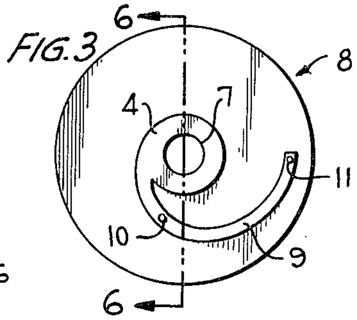
FIG. 3 is a plan view of the cathode printed circuit board etched in stripline configuration.
Figure 4:
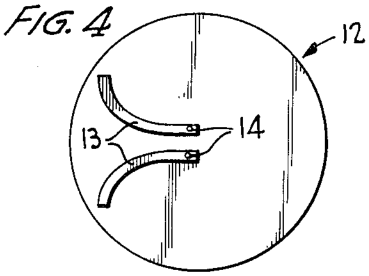
FIG. 4 is a plan view of the filament printed circuit board etched in stripline configuration.
Figure 5:
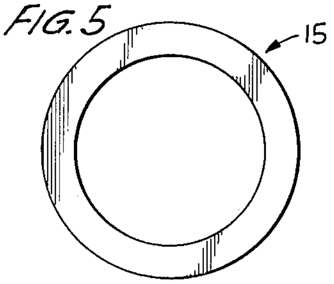
FIG. 5 is a plan view of the dielectric spacers used between the printed circuit boards shown in FIGURES 1, 2, and 3.

Referring now to the drawings wherein like reference numerals designate identical or corresponding parts throughout the several views, and more particularly to FIGURE 1 wherein there is shown the bottom side of the plate printed circuit board 1 having a copper cladding 2 which has been etched so as to provide radial lines 3 emanating from a central plate electrode contact surface 4. The plate electrode of a parallel plane vacuum tube extends through a central hole 5. The copper cladding on the top side of the printed circuit board 1 is not etched except in the immediate vicinity of hole 5 and constitutes the ground plane of the plate stripline circuit. FIGURE 2 shows the bottom side of the grid printed circuit board 6. It is similar to the plate printed circuit board 1 except that the central hole 7 is larger than the hole 5 to accommodate the body of a vacuum tube. The copper cladding on the top side of the printed circuit board 6 is not etched and constitutes the ground plane ofthe grid stripline circuit. The top side of the printed circuit board 8 for the cathode circuit is shown in FIGURE 3. The cathode circuit consists of a three-quarter wave length line 9 which is shorted at point 11 and tapped at point 10 for coupling power into a standard transmission line. The copper cladding on the bottom side of printed circuit board 8 is not etched and constitutes the ground plane for the cathode stripline circuit. FIGURE 4 shows the bottom side of the filament printed circuit board 12. Board 12 has filament lines 13 printed thereon. The filament pins of a vacuum tube extend through holes 14 and make contact with lines 13. The top side of printed circuit board 12 has no copper cladding. The copper cladding on the bottom side of the cathode printed circuit board 8 acts as the ground plane for the filament stripline circuit. FIGURE 5 shows an annular insulating spacer 15. Two are required: one between the plate and grid printed circuit boards 1 and 6, respectively, and one between the grid and cathode printed circuit boards 6 and 8, respectively.

Figure 6:
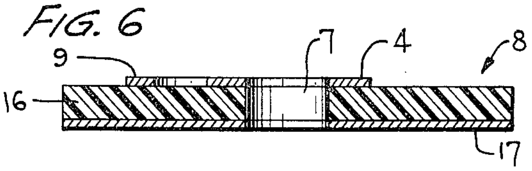
FIG. 6 is an enlarged cross sectional view of the cathode printed circuit board shown in FIGURE 3.

Reference is now made to FIGURE 6 which illustrates the construction of the printed circuit boards 1, 6, and 8. FIGURE 6 is a cross sectional view of a cathode printed board 8. On the top side of the board is the electrode contact ring 4 which encircles the central hole 7. The hole 7 has a diameter slightly larger than the diameter of the body of a vacuum tube thereby allowing a tube to be press fitted into the board. The cathode line 9 is shown extending off to the left of the electrode contact ring 4. The ring 4 and the line 9 are bonded to a suitable dielectric 16. The ground plane 17 is bonded on the bottom side of the dielectric 16. The construction of the filament printed circuit board 12 is the same except the ground plane 17 is omitted.

Figure 7:
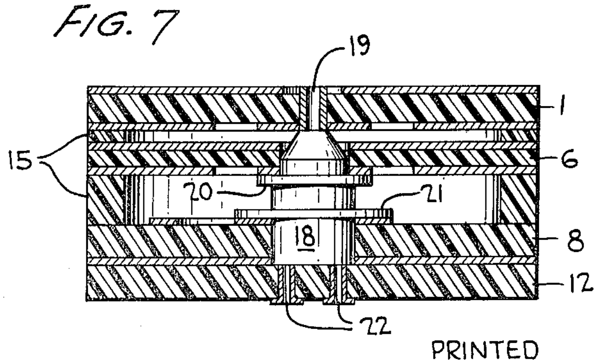
FIG. 7 is an enlarged cross sectional view of the assembled oscillator showing the mounting of the parallel-plane vacuum tube.

FIGURE 7 shows a cross sectional view of the assembled oscillator. Parallel plane vacuum tube 18 is shown press fitted into the center of the structure. Plate electrode 19 of the tube 18 extends through the central hole of the plate printed circuit board 1 and makes contact with the electrode contact ring. The body of the tube 18 extends through the central holes of the grid and cathode printed circuit boards 6 and 8, respectively, the grid electrode 20 and the cathode electrode 21 making contact with their corresponding electrode contact rings. The filament electrode 22 extends through the filament printed circuit board 12 to make contact with the filament lines. The complete structure of the oscillator may be conveniently housed in a cylindrical container which provides structure for connecting the various ground planes together. Obviously, the circular geometry shown is merely a matter of design choice and any other geometry may be used.

Figure 8:
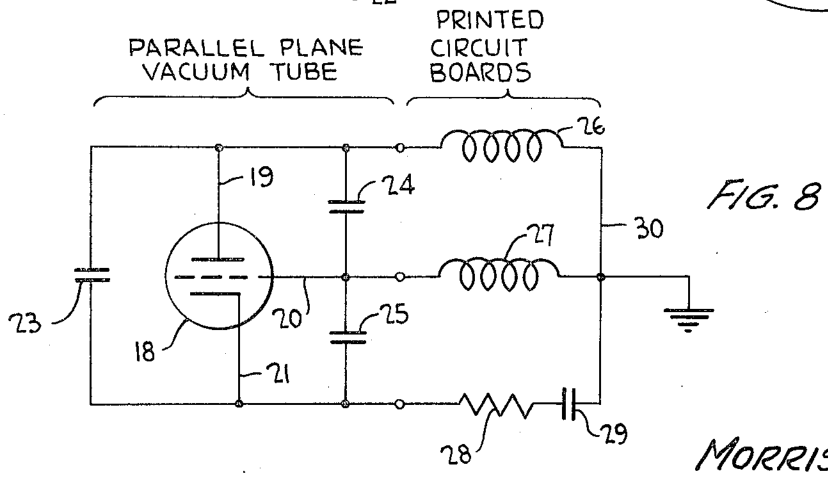
FIG. 8 is a schematic diagram of the equivalent circuit of the structure shown in FIGURE 7.

The equivalent RF circuit of the structure of FIGURE 7 is shown in FIGURE 8. The parallel plane vacuum tube 18 is shown as having the following interelectrode capacitances: plate to cathode capacitance 23, plate to grid capacitance 24, and grid to cathode capacitance 25. Inductance 26 which is connected between the plate electrode 19 and ground plane 30 is the radial lines 3 of the plate printed circuit board 1. Similarly, inductance 27 which is connected between grid electrode 20 and ground plane 30 is the radial lines 3 of the grid printed circuit board 6. The cathode impedance comprising resistor 28 and capacitor 29 connected in series between cathode electrode 21 and ground plane 30 is the cathode line 9 of the cathode printed circuit board 8. The inductances 26 and 27 are designed to resonate with the plate to grid interelectrode capacitance 24. Addition or removal of the radial lines 3 on printed circuit boards 1 and 6 changes the values of the inductances 26 and 27 thereby providing frequency and feedback adjustment of the oscillator circuit. Feedback is also determined by the length of the cathode line 9 as well as the position of the coupling point 10 shown in FIGURE 3. These two parameters determine the value and character of the cathode impedance represented in FIGURE 8 as resistor 28 and capacitor 29.

It will be apparent that the embodiment shown is only exemplary and that various modifications can be made in construction and arrangement within the scope of the invention as defined in the appended claims.

I claim as my invention:

1. A vacuum tube oscillator circuit comprising:

(a) a vacuum tube having a plate electrode, a grid electrode, and a cathode electrode, and (b) a microwave stripline circuit connected to said vacuum tube and having a reactive impedance at the frequency of oscillation which resonates with the plate to grid interelectrode capacitance of said vacuum tube, said microwave stripline circuit comprising:

(1) a first printed circuit board having copper cladding on two surfaces, the copper cladding on one surface being etched to form a plate electrode contact surface and radial lines emanating from said plate electrode contact surface, the copper cladding on the other surface not being etched and forming the ground plane for the etched surface, said plate electrode contact surface contacting and making electrical connection with said plate electrode, and (2) a second printed circuit board having copper cladding on two surfaces, the copper cladding on one surface being etched to form a grid electrode contact surface and radial lines emanating from said grid electrode contact surface, the copper cladding on the other surface not being etched and forming the ground plane for the etched surface, said grid electrode contact surface contacting and making electrical connection with said grid electrode, (3) the number and length of said radial lines on said first and second printed circuit boards being chosen to attain the desired plate to grid feedback signal and the desired frequency of oscillation.

2. The vacuum tube oscillator circuit described in claim 1 further comprising a cathode microwave stripline circuit including a third printed circuit board having copper cladding on two surfaces, the copper cladding on one surface being etched to form a cathode electrode contact surface and a line emanating from said cathode electrode contact surface, the copper cladding on the other surface not being etched and forming the ground plane for the etched surface, said cathode electrode contact surface contacting and making electrical connection with said cathode electrode, said line being shorted to the ground plane at a point distant from said cathode electrode contact surface and being tapped for an output connection at a point between said cathode electrode contact surface and said shorted point.

3. The vacuum tube oscillator circuit described in claim 2 wherein said vacuum tube is a parallel plane vacuum tube.

References Cited by the Examiner

UNITED STATES PATENTS

| | | | |
|---|---|---|---|
| 2,427,110 | 9/1947 | Selby | 333—73 |
| 2,817,719 | 12/1957 | Decker | 333—84 |
| 2,933,704 | 4/1960 | Janssen et al. | 333—84 |
| 2,951,149 | 8/1960 | Grieg et al. | 333—84 |
| 3,177,453 | 4/1965 | Putzer | 333—84 |

ROY LAKE, *Primary Examiner.*

JOHN KOMINSKI, *Examiner.*